United States Patent [19]

Hibbert et al.

[11] Patent Number: 4,698,727
[45] Date of Patent: Oct. 6, 1987

[54] COMPACT NON-METALLIC LOAD CENTER ENCLOSURE

[75] Inventors: David A. Hibbert, Tolland; Larry J. Newmark, Avon, both of Conn.

[73] Assignee: General Electric Company, New York, N.Y.

[21] Appl. No.: 907,250

[22] Filed: Sep. 15, 1986

[51] Int. Cl.⁴ .............................................. H02B 1/04
[52] U.S. Cl. .................................... 361/356; 361/357; 361/363
[58] Field of Search ............... 361/361, 355, 357, 358, 361/360, 363, 356

[56] References Cited

U.S. PATENT DOCUMENTS 3,801,875  4/1974  Morby et al. ..................... 361/355
3,852,514  12/1974  Lauben ........................... 361/357

Primary Examiner—G. P. Tolin
Assistant Examiner—Morris Ginsburg
Attorney, Agent, or Firm—Richard A. Menelly; Walter C. Bernkopf; Fred Jacob

[57] ABSTRACT

A molded plastic load center enclosure allows the circuit breakers contained therein to be compactly aligned on one side of the enclosure. The insulative properties of the plastic allows the circuit breaker branch straps to be mounted on the bottom and side walls of the enclosure. The end of the bottom-mounted branch strap is formed for direct connection with the line terminals. The end of the side-mounted branch strap is apertured for convenient connection with the load terminals.

10 Claims, 5 Drawing Figures

COMPACT NON-METALLIC LOAD CENTER ENCLOSURE

BACKGROUND OF THE INVENTION

U.S. Pat. No. 3,801,875, entitled "Non-Metallic Load Center With Improved Bus Bar Construction", describes a molded plastic load center wherein the plastic case includes circuit breaker and branch strap mounting means integrally formed therein. The insulative properties of the plastic allows the circuit breakers to be compactly arranged without fear of electrical breakdown between the breakers or the terminal connections. The circuit breaker branch straps are mounted on the bottom surface of the plastic enclosure. Access to the terminal connections is made by unscrewing the cover from the case and lifting the cover away from upstanding tabs integrally formed within the case.

U.S. patent application Ser. No. 874,755, filed June 16, 1986, entitled "Molded Plastic Enclosure For Electric Service Apparatus", describes one such enclosure including an access door mounted on the cover for convenient access to the circuit breakers contained therein. A locking hasp is integrally formed on the door for padlocking the door against unauthorized access.

U.S. patent application Ser. No. 811,716, filed Dec. 20, 1985, entitled "Molded Plastic Enclosure For Disconnect Switches", wherein an access door is formed within the cover and hasp means are integrally formed within the cover for the arrangement of a padlock to prevent unauthorized access. The switches contained within the enclosure are of the type used with air conditioning disconnects. Both aforementioned Patent Applications are incorporated for reference purposes and should be reviewed for a good description of the relationship between the molded plastic door, cover and case used for housing both circuit breakers and electric switches.

Although non-metallic load centers have found limited application over the past few years, wide market acceptance has not, as yet, been realized mainly due to the lower cost of comparable metallic load centers. The purpose of the instant invention is to described a molded plastic enclosure for circuit breakers wherein the three plastic enclosure components are formed on automated equipment and wherein the metallic components are inserted by means of a completely automated process. It has since been determined that the savings realized by complete automation results in a molded plastic circuit breaker enclosure that is less expensive than comparable metallic circuit breaker enclosures.

SUMMARY OF THE INVENTION

A molded plastic enclosure for circuit breakers wherein the three plastic components are formed by means of a high speed injection molding process and wherein the non-metallic components are capable of robotic assembly in a completely automated process. The arrangement of a two-component orthogonal branch strap, one part mounted on the bottom of the enclosure and the other part mounted on a side wall allows the circuit breakers and other electrical components to be robotically assembled.

DESCRIPTION OF THE PREFERRED EMBODIMENT

Figure 1:
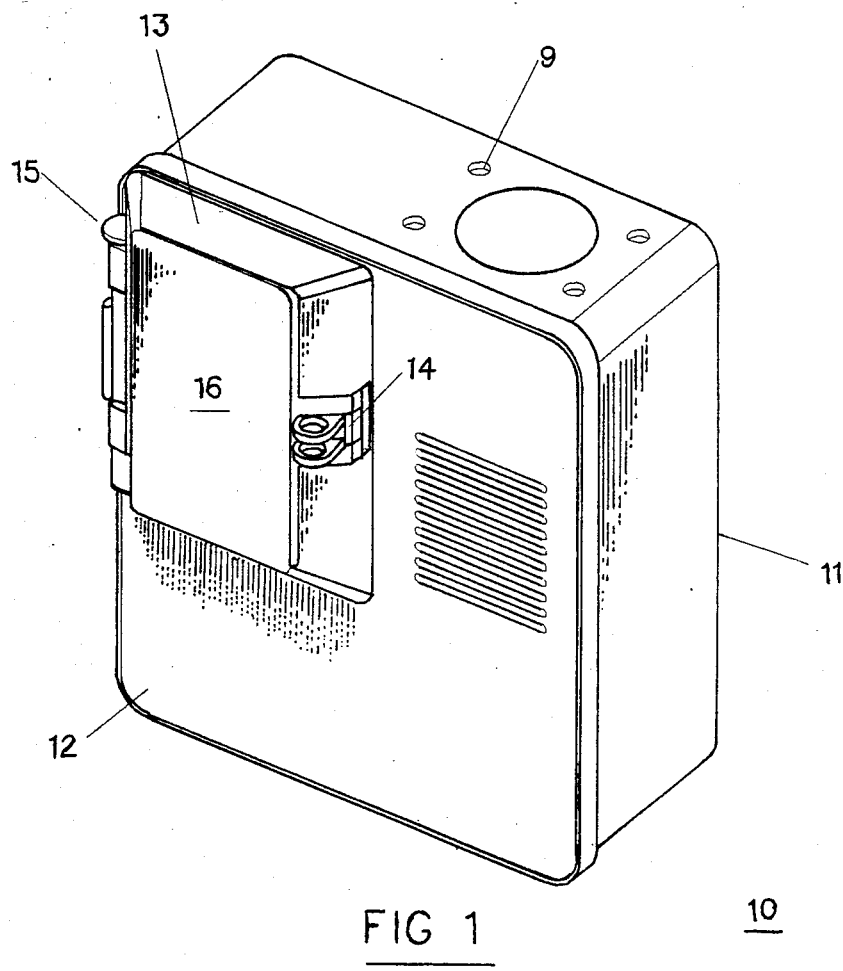
FIG. 1 is a front perspective view of the compact non-metallic load center according to the invention.

A molded plastic load center 10 is shown in FIG. 1, wherein a plastic case 11 is attached to a plastic cover 12 to which a plastic door 13 is mounted by means of a hinge assembly 15. A locking hasp 14 is integrally formed on the door and the door face 16 can be transparent for viewing the ON-OFF condition of the circuit breakers contained therein. Four screw holes 9 are formed through the top of the case to facilitate connection to an electric cable conduit.

Figure 2:
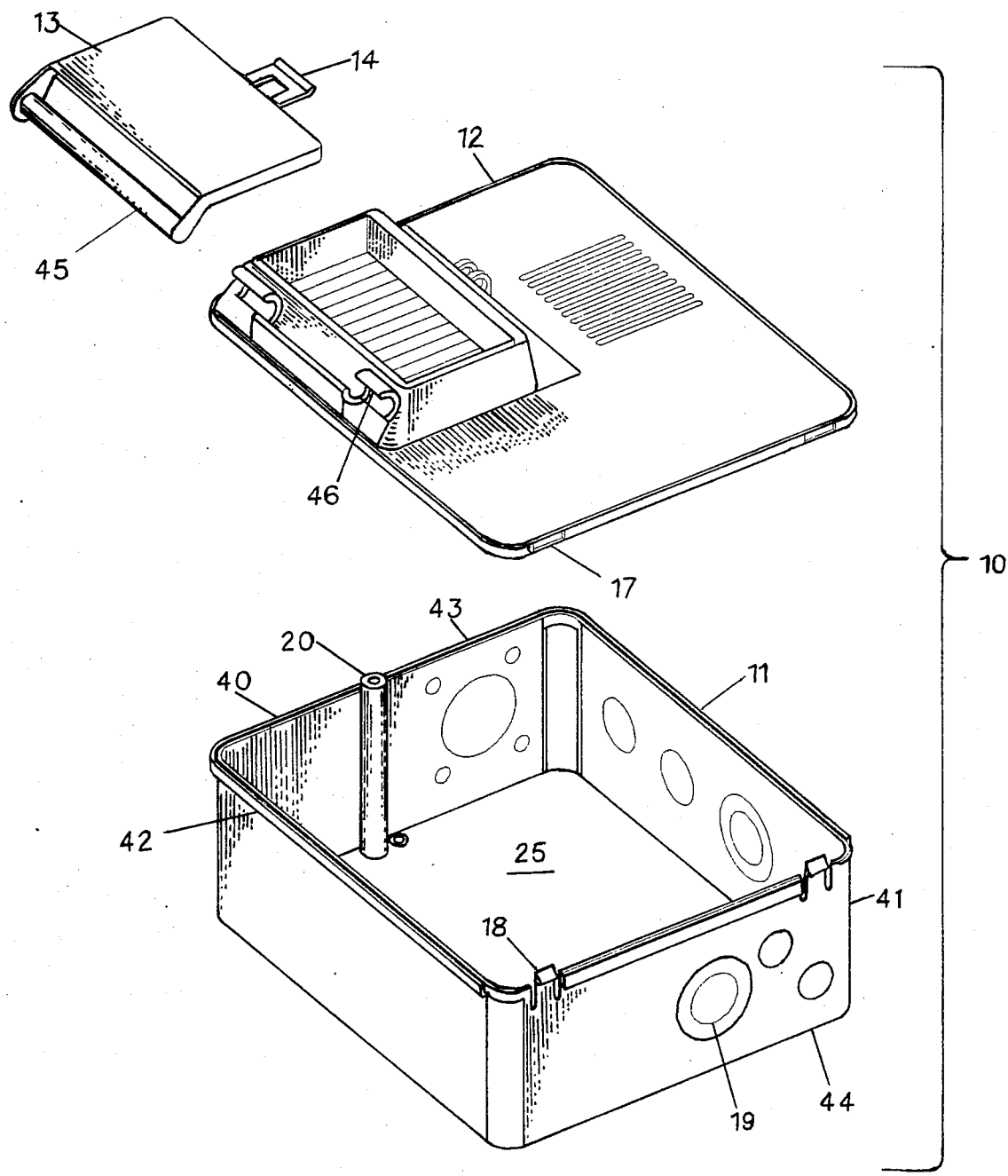
FIG. 2 is a top perspective view in isometric projection of the door, cover and case of the load center depicted in FIG. 1.

As shown in FIG. 2, the load center 10 is formed from three different injection molded parts. The case comprises a pair of opposing side walls 41, 42 joined by top and bottom walls 43, 44 and a bottom 25. A plurality of knockouts 19 are integrally formed within the side walls and the top and bottom walls of the case for passage of electrical cable. A mounting post 20 is integrally formed within the case for receiving a screw to attach the cover 12 after insertion of the integrally formed tabs 18 in the case within the slot 17 formed in the bottom of the cover. The door 13 is next attached by snappingly inserting the hinge pin 45 within the complementary curvilinear protrusions 46 integrally formed in the cover.

Figure 3:
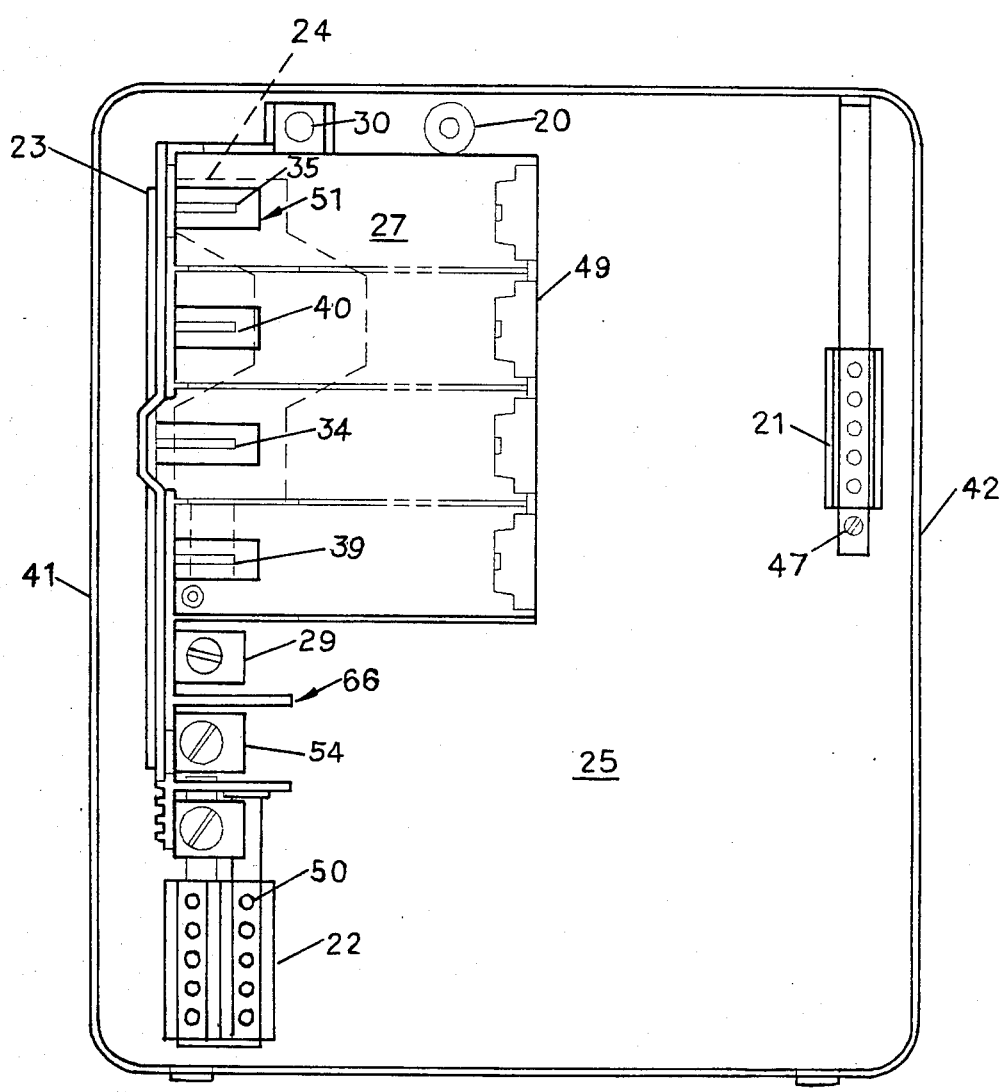
FIG. 3 is a plan view of the load center of FIG. 1 with door and cover removed.

Prior to the attachment of the door and cover to the case, the electrical components are inserted within the case as depicted in FIG. 3. The ground terminal connectors 21 are attached to the bottom 25 of the case by means of machine screws 47. A circuit breaker support assembly 66 consisting of insulative support 49 and an orthogonal composite branch strap assembly 51 is then attached within the case in the following manner. The orthogonal composite branch strap assembly 51 consisting of a side assembly 23 and a bottom assembly 24 are arranged proximate the opposing side wall 41. The bottom branch strap assembly 24 is first attached to plastic insulating circuit breaker support 49 and the line terminal lug 29 is arranged over one end. The bottom branch strap 24 is positioned through plastic insulating support piece 49 so that the circuit breaker stabs 34, 35 on the bottom branch strap assembly are interposed with the circuit breaker stabs 39, 40 on the side branch strap assembly 23, as indicated. The neutral terminal bar 22 containing the neutral terminal screws 50 is then attached to the end of the line terminal lug to complete the assembly.

Figure 4:
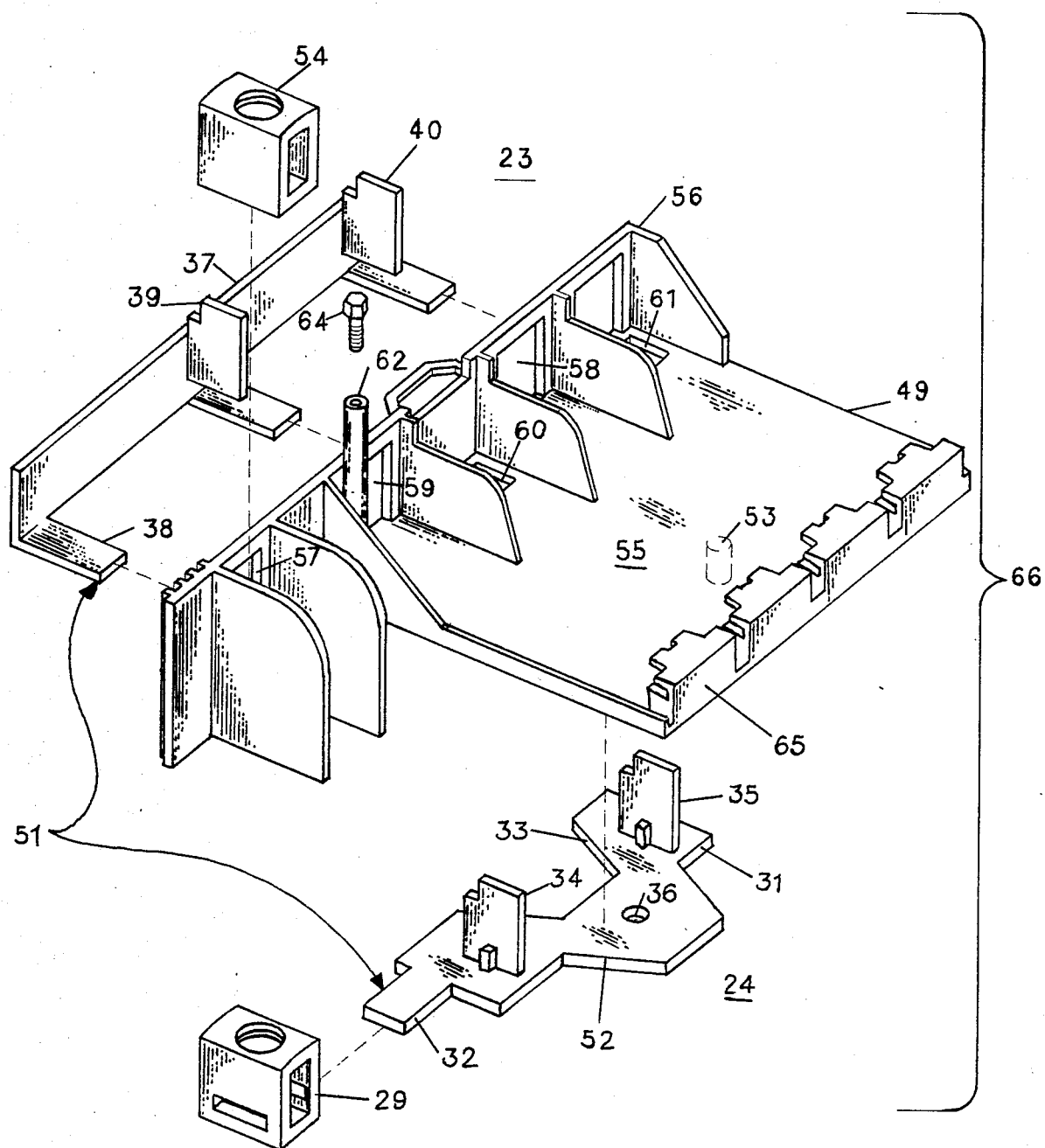
FIG. 4 is a top perspective view in isometric projection of the components used within the circuit breaker support structure shown in FIG. 3.

As shown in FIG. 4, the bottom branch strap assembly 24 comprises a shaped copper bar 31 which includes a rectangular extension 32 for insertion within the line terminal lug 29 and with the upstanding circuit breaker stab connectors 34, 35 brazed or welded thereon. A U-shaped cutout 33 is formed in one side of the shaped copper bar and a locating hole 36 is formed through the U-shaped extension 52 on the opposite side thereof. The bottom branch strap assembly is located on a pin 53 projecting from the bottom of the plastic insulating support 49 through hole 36. The side branch strap assembly 23 comprises a separate rectangular copper bar 37 having the circuit breaker stab connectors 39, 40 welded or brazed to one side and with a terminal connector 38 formed near the end of the bar. The plastic insulating circuit breaker support 49 is formed from a single molding process into a bottom support 55 and a vertically extending back support 56. The load terminal connector 38 on the back branch strap assembly 23 extends through a slot 57 formed through the back support and the circuit breaker stabs 39, 40 extend through the slots 58, 59. Once the back branch strap assembly is positioned against the back support 56, the load terminal lug 54 is then arranged over the load terminal connector 38 and helps to retain the back branch strap assembly against the back support. The bottom branch strap 24 is arranged on the bottom of the bottom support 55 by positioning the locating hole 36 over the pin 53 extending from the bottom support 55 and extending the stabs 34, 35 through the complementary slots 60, 61 formed through bottom support 55. The line terminal lug 29 is then arranged over the extension 32 and helps to retain the bottom branch strap assembly against the bottom of the support. Post 62 extends above the top of the back support 56 and is used to receive a lock nut 64 when the main breaker (not shown) is mounted on the support by means of integrally formed circuit breaker mounting hooks 65.

Figure 5:
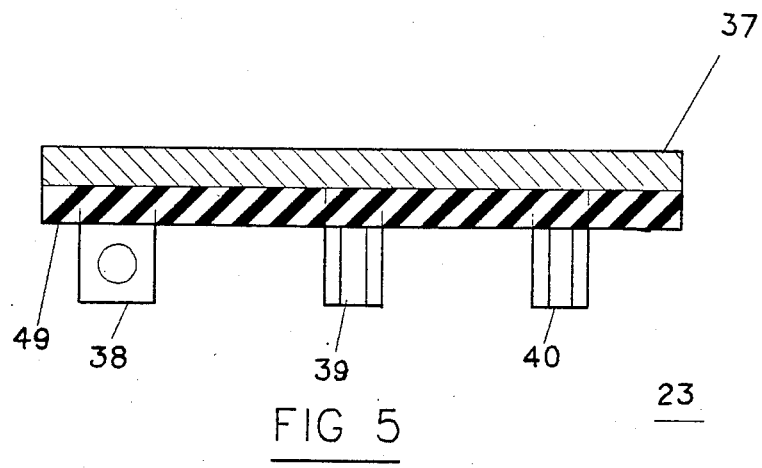
FIG. 5 is a top sectional view of a part of the circuit breaker support structure detailed in FIG. 4.

In FIG. 5, the side branch strap assembly 23 is shown inserted through the back of the plastic insulating support 49 with the copper bar 37 on one side of the plastic support and with the circuit breaker stabs 39, 40 and the terminal connector 38 extending through the plastic support.

The required properties of the plastic materials used to form both the back support 56 as well as the circuit breaker insulating support 49 to meet local and national standards include heat resistance, flame retardance, mechanical impact resistance and electrical resistance as well as chemical resistance. The only materials which tested favorably to date are "Noryl", which is a trade name of General Electric Company for a modified polyphenylene oxide, and "Valox", a registered trade name of General Electric Company for polybutylene terepthalate.

A compact molded plastic circuit breaker enclosure has thus been described wherein the enclosure is formed from three separate injection molding pieces and wherein the circuit breaker branch strap assembly is inserted therein by means of a downloaded automatic assembly process. The automatic assembly features of the loadcenter make the loadcenter economically competitive with existing state-of-the-art metallic load center enclo- sures.

Having thus described our invention, what we claim as new and desire to secure by Letters Patent is:

1. A molded plastic load center comprising:
   a plastic cover removably attached to a plastic case;
   a plastic circuit breaker support comprising a slotted planar bottom support and an apertured upright back support; and
   an orthogonal branch strap assembly comprising;
   a first circuit breaker branch strap supported by said bottom support and having a plurality of first circuit breaker stab connectors extending perpendicular from said first branch strap through said slotted bottom support;
   a second circuit breaker branch strap supported by said back support and having a plurality of second circuit breaker stab connectors extending perpendicular from said second branch strap through said apertured back support, said second circuit breaker stab connectors being interposed with said first circuit breaker stab connectors.

2. The molded plastic load center of claim 1 wherein said first branch strap comprises a shaped metal piece having a rectangular extension on one end for attachment to line terminal lugs within said case.

3. The molded plastic load center of claim 2 wherein said shaped metal piece includes a U-shaped slot on one side and a U-shaped extenson on an opposite side.

4. A molded plastic load center comprising:
   a plastic cover and a plastic case;
   a plastic circuit breaker support comprising a slotted planar bottom support and an apertured upright back support;
   a first circuit breaker branch strap arranged on said bottom support and comprising a shaped metal plate having a rectangular extension on one end of the plate for attachment with a line terminal lug and a U-shaped slot on one side of said first branch strap with a Ushaped extension on an opposite side thereof and including a first pair of circuit breaker stabs extending perpendicular from said plate through slots formed in said bottom support; and
   a second circuit breaker branch strap comprising a rectangular plate having a second pair of circuit breaker stabs extending perpendicular therefrom, said second branch strap being arranged on said back support with said second pair of circuit breaker stabs extending through apertures formed in said back support.

5. The molded plastic load center of claim 4 wherein said first circuit breaker stabs are interposed with said second circuit breaker stabs.

6. The molded plastic load center of claim 5 including a plurality of neutral connector terminals attached to a bottom and arranged proximate a side wall on said plastic case.

7. The molded plastic load center of claim 4 wherein said plastic case includes an integrally formed mounting post for attachment of said plastic cover.

8. The molded plastic load center of claim 4 including means integrally formed on said back support for preventing circuit breakers from being removed from said case.

9. The molded plastic load center of claim 4 wherein said back support and said bottom support each comprise a thermoplastic.

10. The molded plastic load center of claim 9 wherein said thermoplastic comprises a modified polyphenylene oxide or polybutylene terepthalate.

* * * * *